United States Patent

[11] 3,622,597

[72] Inventors Jon E. Fletcher;
 Rodney A. Nelson, both of Midland, Mich.
[21] Appl. No. 759,775
[22] Filed Sept. 13, 1968
[45] Patented Nov. 23, 1971
[73] Assignee The Dow Chemical Company
 Midland, Mich.

[54] METHOD OF PREPARING THIIRANES FROM MERCAPTOALCOHOLS
 16 Claims, No Drawings

[52] U.S. Cl. .................................................. 260/327 E,
 252/11, 252/89, 252/364, 260/79.7, 260/607 A
[51] Int. Cl. ...................................................... C07d 59/00,
 C11d 7/34
[50] Field of Search ............................................ 260/327 E

[56] References Cited
 UNITED STATES PATENTS
 2,436,233 2/1948 Signaigo ...................... 260/327
 OTHER REFERENCES
 Adkins, Reactions of Hydrogen, (U. Wisconsin, Madison, 1937), pp. 25– 26.

*Primary Examiner*—Henry R. Jiles
*Assistant Examiner*—Cecilia M. Shurko
*Attorneys*—Griswold and Burdick and S. Hoynak

ABSTRACT: The method comprises continuously adding mercaptoalcohols to a heated solution of a dehydration catalyst dissolved in a liquid diluent. The diluent and catalyst are of low volatility at the reaction temperature. The thiirane is continuously removed from the reaction mixture.

METHOD OF PREPARING THIIRANES FROM MERCAPTOALCOHOLS

This invention relates to a method of preparing thiiranes by dehydrating mercaptoalcohols and more particularly pertains to a method of making thiiranes by continuously feeding a mercaptoalcohol to a heated mixture of a dehydrating catalyst dissolved in a diluent of low volatility, at a temperature sufficiently high to continuously volatilize the thiirane but under conditions such that the diluent or solvent and catalyst are not removed by evaporation and at which the solvent is not decomposed appreciably.

In accordance with this invention compounds of the structure

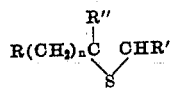

wherein R represents hydrogen, halogen, alkyl, haloalkyl, cycloalkyl, olefin, alkoxy, aryloxy, aryl, aralkyl, alkaryl, carboxy, hydroxyl, thioalkyl, and thiol groups in which the organic radical has from one to about 10 carbon atoms and R' and R'' each represents hydrogen and alkyl groups of from one to two carbon atoms and $n$ is a member from zero to two can be prepared by continuously commingling a mercaptoalcohol of the structure

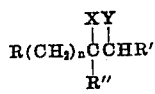

where R, R', and R'' and $n$ each have the designation given above and X and Y each represents -OH and -SH and when one of X and Y is -OH the other is -SH with a mixture consisting essentially of a dehydration catalyst dissolved in a high boiling diluent, at a temperature such that the thiirane formed is continuously removed by volatilization, but at which the catalyst and its solvent are relatively nonvolatile.

The thiiranes, which are also termed episulfides or alkylene sulfides, made by the process of this invention are useful for preparing homopolymers and copolymers by opening of the thiirane ring sulfur atom. The polymers are useful for making films and other articles which are rubbery or plastic in their physical features. The homopolymers and copolymers can be plastics or elastomers. These can be formed into films or sheets, which are useful as protective or coating materials for cellulosic materials, including wood. The polymers can also be molded or extruded into a variety of articles such as containers or tubing. Low molecular weight polymers and copolymers are liquids which can be used as lubricants. The thiiranes can be used as ingredients in the synthesis of thioethers, which can be oxidized to sulfoxides and sulfones. The oxidized products are useful as solvents, if liquid and as detergents, if solid.

No method prior to this invention was known for preparing thiiranes directly from mercaptoalcohols in good yields, because of the reactivity of the thiirane sulfur atom, especially through polymerization by opening the thiirane ring. The polymerization reaction is especially sensitive to acid and alkaline catalysis.

Prior art methods describe procedures for obtaining yield of 60 percent of

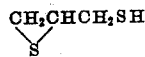

by refluxing 2, 3-dimercapto-1-propanol at about 111° C. under a vacuum of 10 mm. Hg, while fractionating the thiirane from the mixture. The catalysts described include zinc chloride, ferric chloride, HCl, HBr and a mineral acid. No solvent was used.

In another process 2,3-dimercapto-1-propanol is dehydrated using a bisulfate as a dehydration catalyst. The mercaptopropanol is mixed with finely divided KHSO$_4$ and then the mixture is heated to 103°–105° C. under a vacuum of 3 mm. Hg. Nitrogen is used to sweep out the thiirane as it forms. A yield of 69.5 percent of

is reported for this process. When mercaptoethanol was substituted for 2,3-dimercapto-1-propanol, a yield of 5.4 to 12.1 percent is obtained, depending on the conditions and techniques used for dehydration and recovery of the ethylene sulfide.

In contrast, the procedure of this invention consistently produces yields of 78–98 percent of ethylene sulfide.

Representative mercaptoalcohols that can be converted to thiiranes include those of the generic formula

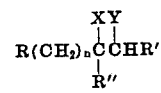

where one of X and Y is -OH and the other -SH, R' and R'' can be H, -CH$_3$, or -C$_2$H$_5$ and R can be H, CH$_2$Cl, CH$_2$Br, CH$_2$F, CH$_2$=CH, Br, Cl, F, OH, SH, CH$_3$-O, C$_2$H$_5$O-, C$_3$H$_7$O-, C$_4$H$_9$O-, allyloxy, allylthio, phenyl, phenoxy, halophenyl, halophenoxy, and alkyl ring-substituted derivatives of the phenyl compounds. As mentioned above, R can be any organic group having one to 10 carbon atoms which is not reactive with the ring sulfur atom of the thiirane that is formed. It is necessary that the thiirane be sufficiently volatile at the reaction temperature to be readily removed as a vapor.

The reaction is carried out at elevated temperatures of 110°–200° C. and preferably from about 125°–165° C. It is to be understood that the reaction temperature will necessarily be at least as high as the boiling point of the thiirane that is formed under the pressure conditions employed. It is preferred to use a reaction temperature which strips the thiirane from the solvent substantially as rapidly as it forms.

The reaction should be carried out under reduced pressure of 1–200 mm. Hg. The preferred range will depend in part on the temperature employed and in part on the boiling point of the solvent and that of the thiirane. Generally, a preferred pressure range is from 5–100 mm. Hg. It is to be understood that the optimum vacuum for operating the process will vary somewhat depending on other conditions employed.

The solvents to be used are compounds of high boiling point having a vapor pressure no greater than about 10 mm. Hg at 70° C. and which are capable of dissolving an acidic dehydration catalyst to the extent of at least 0.1 percent by weight based on the weight of solvent or diluent used, and which do not decompose the diluent appreciably at the reaction temperature used.

One method for testing the suitability of the diluent or solvent for the purposes of this invention is to mix 100 parts of the diluent with 0.002 to 0.2 acid equivalents or more of the catalyst and titrate an aliquot of the diluent or solvent for the amount of catalyst dissolved. The solubility of the mercaptoalcohol can be tested similarly by mixing with the diluent and analyzing an aliquot for mercaptan groups or sulfur.

If an adequate amount of catalyst is dissolved the solution should be heated to 110°–200° C. under a vacuum of 1–200 mm. Hg to estimate the degree of decomposition of the diluent under these conditions. Usually decomposition of the diluent is evidenced by a darkening or even charring of the diluent. Weight loss and gas evolution are also useful for determining degree or decomposition. It is to be understood that a diluent which reacts with the acid catalyst without evidence of decomposition can be employed. Typical compounds which can react with H$_2$SO$_4$ are alkanols, polyglycols or their monoethers, which form sulfate derivatives.

Representative high boiling solvents or diluents include, but are not limited to, polyethylene or polypropylene or polybutylene glycols, copolymers of ethylene, propylene or butylene oxides, all of which must be liquid at reaction temperature, ethylene or propylene or butylene glycol monophenyl ethers, the mono- or di- methyl, ethyl, propyl or butyl ethers of diethylene glycol dipropylene glycol or dibutylene glycol, the mono- and di- methyl, ethyl, propyl and butyl ethers of triethylene glycol, tripropylene glycol or tributylene glycol, mono- and di- methyl, ethyl, propyl and butyl ethers of tetraethylene glycol, tetrapropylene glycol, tetrabutylene glycol, and long chain alkanols having 12 to 20 atoms. The polyglycol mono- and diethers can be copolymers of two or more of ethylene propylene and/or butylene oxides.

The range of solvent can be as low as 50 percent and as high as 97–99 percent by weight of the reaction mixture.

The dehydration catalysts which can be employed are $H_2SO_4$, $H_3PO_4$, alcohol sulfates, alcohol sulfonates of two to 20 C atoms, preferably two to 14 C atoms, phenyl sulfonic acid, ring alkylated, or halogen substituted phenyl sulfonic acids, such as tolyl sulfonic acid, chlorophenyl sulfonic acid, or ethylphenyl sulfonic acid.

The proportion of catalyst can range from about 0.002 to about 0.2 acid equivalents per 100 parts by weight of solvent. Usually 0.005 to 0.06 acid equivalents per 100 parts by weight of solvent is ample and the use of more than about 0.06 acid equivalents of catalyst does not appear to affect the rate of dehydration any more favorably than that at about the 0.06 acid equivalent level.

Addition of a thiirane stabilizer to the reactor is desirable, but not essential. The preferred stabilizers are long chain alkyl mercaptans representatives of which are lauryl mercaptan, n-octyl mercaptan and t-dodecyl mercaptan. The amount of stabilizer can range from about 0 to about 20 percent by weight based on the weight of solvent employed.

If desired an inert gas such as $CO_2$, nitrogen, argon, krypton, xenon, or helium, or water vapor, lower alkanols or an inert organic volatile hydrocarbon such as the lower alkanes having one to about eight carbon atoms or any volatile compound which is nonreactive with the thiirane can be used as a sweep gas either intermittently or continuously during the reaction.

One way of carrying out the process of this invention is to add to the reactor solvent, catalyst and thiirane stabilizer, if used, and heat the mixture to the desired temperature and adjust the pressure in the system. The mercaptoalcohol, additional solvent and makeup catalyst, if desired, with or without the stabilizer and an inert ingredient which is a vapor at the temperature and pressure employed, if desired, are fed into the reactor. The thiirane which forms together with water and usually small amounts of unreacted mercaptoalcohol are flashed from the solvent. The vapors which are removed from the reaction system can be separated and purified by distillation. A distillation column can be placed at the top of the reactor, if desired, or it can be employed as a separate unit in the process train. If the distillation column is at the top of the reactor the small amount of unconverted mercaptoalcohol can be condensed preferentially and returned to the reactor. Small amounts of solvent are withdrawn from the reactor to keep the level of solvent substantially uniform.

The examples which follow are intended to illustrate the invention, but not to limit it. All parts are by weight unless otherwise specifically indicated.

EXAMPLE 1

The reactor consisted of a 1-liter round bottomed flask fitted with a stirrer and a fractionating column which had a reflux head and an inlet for a solution of mercaptoalcohol and make up $H_2SO_4$ dissolved in a solvent. The column was connected to a condenser and a cold trap cooled with dry ice. The condenser was cooled with a $CaCl_2$-water mixture having a temperature of —10° to −15° C. or water at a temperature of about 4° C.

The cold trap was connected to a vacuum pump.

The base of the reactor contained a valve through which solvent mixture could be withdrawn at a rate such that the liquid level in the flask could be maintained substantially constant.

The reactor was charged with 650 parts of a technical grade of triethylene glycol monobutyl ether which contains some higher polymeric homologues, as a solvent, 20 parts of t-dodecyl mercaptan and 4.9 parts of 95 percent $H_2SO_4$. A vacuum of 40 mm. Hg was drawn on the system and the mixture was heated to 145° C. and held at approximately this temperature during the entire run. A feed consisting of 78 percent 2-mercaptoethanol, 19.9 percent of the solvent mentioned above, 1.6 percent water and 0.5 percent $H_2SO_4$ was added to the reactor continuously at a rate of about 3 ml. per minute until a total of 1,164 g. were charged. A solvent stream was continuously removed from the reactor to maintain the liquid level substantially constant. Of the 908 grams of 2-mercaptoethanol fed, 121 grams were recovered from the overhead water layer and 559 grams of ethylene sulfide

were formed. This represents a yield of 92.3 percent on the mercaptoethanol reacted and 81.4 percent on the mercaptoethanol fed. The water layer and the solvent which had been withdrawn from the reactor can be filtered and recycled to the process.

EXAMPLE 2

The apparatus used in this example was the same as that described above. The reactor was charged with 650 parts of a technical grade of triethylene glycol monobutyl ether, 19.5 parts of t-dodecyl mercaptan and 5.2 parts of 95 percent $H_2SO_4$. A vacuum of 73 mm. Hg was drawn on the system and the mixture was heated to 144° C. Then 2,520 parts of a mixture consisting of 49.4 weight percent of mercapto-2-propanol, 10.9 percent water, 1.6 percent t-dodecyl mercaptan, 37.8 percent technical grade triethyleneglycol monobutyl ether and 0.3 percent $H_2SO_4$ were added to the reactor continuously at a rate of about 10 ml. per minute, while maintaining the temperature at about 145° C. Solvent was continuously removed to maintain the liquid level in the reactor substantially constant. The propylene sulfide

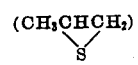

, water and unconverted mercapto propanol were removed continuously. The solvent can be filtered and recycled.

The overhead contained 883 parts of propylene sulfide and 92 parts of unconverted mercaptopropanol. The yield of thiirane on the mercaptopropanol reacted was 96.1 percent and that on the mercaptopropanol charged was 88.9 percent.

EXAMPLE 3

In this run the reactor was connected by a side arm to a fractionating column fitted with a reflux head. The column had a reboiler of 1-liter capacity. The overhead from the fractionating column passed through a condenser cooled with a liquid having a temperature of 0° to −10° C. The receiver was cooled with solid $CO_2$. The vapors from the condenser passed through a cold trap cooled with solid $CO_2$.

The reactor was charged with 700 parts of polyethylene glycol having a molecular weight of about 400 and 5.25 parts of 95 percent $H_2SO_4$. The reboiler was charged with 500 ml. of distilled water and 7 grams of monosodium phosphate monohydrate. A vacuum of 78 mm. Hg was drawn on the system and the mixture in the reactor was heated to 143° C. Then 2,820 parts of a feed consisting of 48.2 percent 1-mercapto-2-propanol, 0.2 percent $H_2SO_4$, 25.5 percent water and 26.1 percent of the above defined polyethylene glycol at a rate of about 10 ml. per minute were added, while maintaining the temperature at about 143° C. The reactor pressure varied between 75 and 85 mm. Hg, averaging about 80 mm.

Propylene sulfide, water and unconverted mercaptopropanol were flashed into the continuous still. Of the 1,360 parts of mercaptopropanol charged 480 parts were unconverted. Also 602 parts of propylene sulfide were recovered. The yield on the mercapto alcohol reacted was 85.0 percent.

EXAMPLE 4

The apparatus of example 1 was used for this run.

The reactor was charged with 650 parts of a technical grade of triethylene glycol monobutyl ether, 20 parts of t-dodecyl mercaptan, and 4.9 parts of 95 percent $H_2SO_4$. A vacuum of 65 mm. Hg was drawn on the system and the temperature in the reactor was raised to 145° C. Then 707 parts of a feed consisting of 5.85 percent 1-mercapto-2-propanol and 94.15 percent of 1-mercapto-2-butanol were continuously charged to the reactor at a rate of about 3 ml. per minute.

The organic layer from the distillation totaled 521 grams. This was fractionated and found to contain 27.5 parts propylene sulfide, 466.5 parts of butylene sulfide and 27 parts of unidentified still bottoms. The yield of thiiranes on the mercaptoalcohols fed was 84.3 percent.

EXAMPLE 5

The apparatus used in this run was that described in example 1.

The reactor was charged with 600 parts of tripropylene glycol methyl ether and 3 parts of 95 percent $H_2SO_4$. A vacuum of 68 mm. Hg was drawn on the system and the reactor contents were heated to 145° C. Then 2,480 parts of feed consisting of 63 percent 1-mercapto-2-propanol, 1.62 percent isopropanol, .65 percent bis-hydroxypropyl sulfide, 12.82 percent water, 21.78 percent tripropylene glycol methyl ether and 0.12 percent, 95 percent $H_2SO_4$ were added continuously at a rate of about 5 ml. per minute. Solvent was withdrawn from the reactor to maintain a substantially constant liquid level.

The effluent from the still contained 42.1 parts of unreacted mercaptopropanol and 1,189 parts of propylene sulfide. This is a 97.3 percent yield based on the mercaptopropanol converted.

EXAMPLE 6

The apparatus described in example 3 was employed. The flask was charged with 675 grams of triethylene glycol monobutyl ether containing 0.76 weight percent of $H_2SO_4$ and 3 percent dodecyl mercaptan. A feed mixture containing 49.4 percent 1-mercapto-2-propanol, 10.92 percent water, 37.6 percent of the above solvent, containing 715 percent $H_2SO_4$ and a small amount of dodecyl mercaptan was fed at a rate of 655 grams per hour. The reaction was run at a pressure of 73 mm. Hg and 144° C. During the run of 230 minutes, 93 percent of the mercaptopropanol was converted and the yield of propylene sulfide based on the converted mercapto propanol was 95 percent.

EXAMPLE 7

The reactor of example 3 was charged with 675 grams of triethylene glycol monomethyl ether containing 0.715 weight percent $H_2SO_4$ and 3 percent dodecyl mercaptan. The mixture was heated to 145° C. and a vacuum of 75 mm. Hg was drawn. 1-mercapto-2-propanol without solvent was fed at a rate of 294 g. per hour. During the run of 225 minutes, 86 percent of the mercaptoalcohol was reacted and the yield of propylene sulfide based on the reacted mercaptoalcohol was 95.5 percent.

EXAMPLE 8

The apparatus described in the previous example was used. A mixture of 675 grams of triethylene glycol monomethyl ether containing 0.73 weight percent $H_2SO_4$ and 3.0 percent dodecyl mercaptan was heated to 145° C. and a vacuum of 40 mm. Hg was drawn on the system. A feed containing 78 weight percent mercaptoethanol, 2 percent dodecyl mercaptan and 20 percent of the said solvent was fed at a rate of 228 g. per hour over a 370 minute period. In this run 87 percent of the mercaptoethanol reacted and the yield of ethylene sulfide based on the reacted mercaptoethanol was 92.3 percent.

EXAMPLE 9

In this run the reactor was the same as described in example 1. The reactor was charged with 250 g. of diethylene glycol monobutyl ether containing 0.75 weight percent $H_2SO_4$. The mixture was heated to 140° C. and a vacuum of 75 mm. Hg was drawn. A total of 500 g. of 1-mercapto-2-propanol at a rate of 2.75 g. per minute was fed into the reactor at the conditions described. During the run about 92 percent of the mercaptopropanol was converted and the yield of propylene sulfide based on the converted mercaptoalcohol was 95 percent.

When mercaptoethanol was substituted for mercaptopropanol under the same reaction conditions and feed rates, the conversion of the mercaptoethanol was 92 percent, with a yield of 92 percent ethylene sulfide based on the converted mercaptoethanol.

EXAMPLE 10

The reactor was similar to that of example 1, with the exception that the fractionating column was removed and the outlet from the reactor was connected directly to a cold trap. A mixture of 267 g. triethylene glycol diethylether containing 0.67 weight percent $H_2SO_4$ was charged to the reactor. The temperature was raised to 142° C. and a vacuum of 105 mm. Hg was drawn on the system. A total of 300 g. of mercaptoethanol was slowly added to the reactor while maintaining the specified pressure and temperature. In the run 94 percent of the mercaptoethanol reacted with a 89 percent yield of ethylene sulfide, based on the reacted thioalcohol.

EXAMPLE 11

A 500 ml. round bottom flask was connected to the bottom of a Vigeraux column having a water cooled reflux condenser. Product from the reflux condenser was collected in dry ice cooled receivers. Vacuum in the system was maintained by a vacuum pump connected to the receivers. A pump was used for adding the mercapto propanol at a uniform rate to the 500 ml. round bottom flask.

Two hundred grams of a technical grade 1-tetradecanol, and 3 grams of concentrated sulfuric acid were charged to the round bottom reaction flask. After heating to 145° C. and regulating the pressure at 70 mm. Hg, 99.9 grams of 1-mercapto-2-propanol were pumped to the reactor at about 0.8 ml./min. After all the mercapto alcohol was added the reaction was continued for about 15 minutes and the vacuum reduced to 22 mm. Hg to remove any remaining mercapto alcohol from the reactor.

There was collected 21 grams of a water layer and 70 grams of an oil layer in the receivers. Estimated yield of propylene sulfide based on converted mercapto propanol was 90–95 percent.

The procedure described below was used for examples 12–14.

Solvent and acid are added to a round bottom flask agitated by a magnetic bar. A pump for continuously adding the mercaptoalcohol is connected to a side arm of the flask. Connected to a second opening on the flask is a short 8"×1/2" Vigeraux column that is followed by a small water cooled condenser, vacuum cutter, and a graduated receiver. The vapor exit from the vacuum cutter passes to a dry ice cooled trap and from there to a pressure regulator and vacuum pump. The reaction flask also is equipped with a thermowell. The temperature of the reaction flask is controlled by a thermocouple in this thermowell.

After heating the solvent-catalyst system to the desired temperature and evacuating the system to the selected pressure, the mercapto alcohol is slowly added by the pump to the reactor. Reaction product is collected in the graduated receiver and in the trap. After all the mercapto alcohol is added, the reaction is continued until no further overhead product is obtained.

EXAMPLE 12

To the 125 ml. reaction flask was charged 50 grams of polyethylene glycol 400 mol. wt. and 0.5 grams of $H_2SO_4$. 10.3 grams of 3-mercapto-2 --butanol were added to the reactor at 0.2 ml./min. The reactor temperature and pressure were 145° C. and 50 mm. Hg, respectively.

2.2 grams were collected in the receiver and 7.4 grams in the cold trap. Gas liquid chromatography showed the oil in the cold trap to be largely 2,3-epithiobutane. Estimated yield was about 90 percent on the converted material.

EXAMPLE 13

To a 125 ml. reactor containing 50 grams of polyethylene glycol 400 mol. wt. and 0.5 grams of $H_2SO_4$ were charged 10.5 grams of 2,3-dimercaptopropanol at 145° C. and 10 mm. Hg pressure. Feed rate was about 0.2 ml./min. Collected in the receiver was 6.1 grams with 2.9 grams collected in the trap. The overhead material was largely mercapto propyl thiirane. Yields were estimated between 80 and 90 percent.

EXAMPLE 14

Fifty grams of polyethylene glycol 400 mol. wt. and 0.30 grams of sulfuric acid were charged to a 125 ml. reactor and heated to 145° C. under 5 mm. Hg pressure. 19.8 grams of 1-butoxy-3-mercapto-2-propanol were added to the reactor at about 0.2 ml./min. 11.75 grams of product were collected in the graduated receiver and 4.0 grams were condensed in the dry ice trap. Estimated yield of 1-butoxy-2,3-epithiopropane was 70 percent.

EXAMPLE 15

The equipment was similar to that used for examples 12–14 except for the elimination of the Vigeraux column. A 250 ml. reaction flask was used. 100 grams of a triethylene glycol mono-butyl ether and higher polyethylene glycol monobutyl ether solvent along with 2.5 grams of p-toluene sulfonic acid, tech. grade, were charged to the reactor. After heating to 145° C. and evacuating to 70 mm. Hg, 50 ml. or 51.7 grams of 2-mercapto-propanol were added at about 0.6 ml./min. 28.4 grams of mercaptopropanol were unconverted in the distillate. 11.3 grams of propylene sulfide were obtained in the distillate for a yield of 60 percent, based on converted mercaptopropanol.

To show the effect of employing a diluent which is a nonsolvent for the catalyst, the following runs were made in the apparatus used for examples 7–9.

A mixture of 67 percent paraffinic petroleum oil and 33 percent $KHSO_4$ was placed in a Waring Blender to comminute the $KHSO_4$. After thorough mixing and grinding of the solids, the mixture was placed in a 250 ml. reactor. The mixture was heated to 145° C. at 10 mm. Hg. Then 2,3-dimercapto-1-propanol feed was started. Less than 1 ml. of the dimercaptopropanol was added when an uncontrollable foaming occurred. The pressure increased to 35 mm. Hg. After the foaming subsided, the pressure was again reduced to 10 mm. and addition of the dimercaptopropanol was again attempted, with a recurrence of the foaming.

In a second comparative run, 120 grams of a ground mixture of 33 percent $KHSO_4$ and 67 percent diphenyloxide were added to the reactor. The mixture was heated to 145° C. at 10–12 mm. Hg. Then 10.3 grams of 2,3-dimercapto-propanol were added at a rate of 0.3 ml. per minute. The material condensed in the receiver weighed 4.2 grams and consisted primarily of unreacted dimercaptopropanol. The material in the trap weighed 4.5 grams and was largely mercaptopropyl thiirane. The yield of the latter was less than 50 percent.

We claim:

1. A method of preparing compounds of the structure

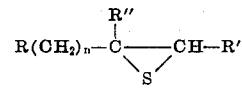

wherein R represents hydrogen, halogen, alkyl, haloalkyl, cycloalkyl, alkenyl, alkyloxy, aryloxy, aryl, aralykyl, alkaryl, carboxy, thioalkyl, hydroxyl and thiol groups in which the organic radical has up to 10 carbon atoms and R′ and R″ each represents hydrogen and alkyl groups of from one to about two carbon atoms and $n$ is an integer from 0 to 2, comprising continuously adding at a pressure of from 1 to 200 mm. Hg a mercaptoalcohol of the structure

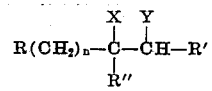

wherein X and Y each represents —OH and —SH and when one of X and Y is OH the other is SH, to a mixture heated to from about 110° to 220° C, said mixture consisting essentially of a solution of an acidic dehydration catalyst selected from the group of sulfuric acid, phosphoric acid, alcohol sulfates, alcohol sulfonates of two to 20 C atoms, phenyl sulfonic acid, ring alkylated or halogen substituted phenyl sulfonic acids in an organic solvent for said catalyst and said mercaptoalcohol, said solvent having a vapor pressure no greater than about 10 mm. Hg at 70° C, said catalyst being substantially nonvolatile at said dehydration temperature and pressure, and continuously volatilizing said thiirane from the mixture.

2. The method of claim 1 in which the catalyst is $H_2SO_4$.

3. The method of claim 1 in which the catalyst is an alkanol sulfate or a sulfate of a polyalkyleneglycol ether.

4. The method of claim 1 in which the solvent is a polymer of molecular weight 200–4,000 of at least one epoxide having two to four C atoms.

5. The method of claim 1 in which the solvent is selected from the class consisting of mono- and diethers of polyalkylene oxides having two to six alkylene groups, each said alkylene group having two to four C atoms, and said ether group having one to four C. atoms.

6. The method of claim 1 in which the solvent is an alkanol of from 12–20 C atoms.

7. The method of claim 1 in which the catalyst concentration ranges from about 0.002 to about 0.2 acid equivalents per 100 parts by weight of solvent.

8. The method of claim 7 in which the catalyst is $H_2SO_4$.

9. The method of claim 1 in which the catalyst is an alkanol sulfate having two to 20 C atoms.

10. The method of claim 1 in which the reaction pressure ranges from 1 to 200 mm. Hg.

11. The method of claim 1 in which the mercaptoalcohol is mercaptoethanol and the thiirane is ethylene sulfide.

12. The method of claim 1 in which the mercaptoalcohol is mercaptopropanol and the thiirane is propylene sulfide.

13. The method of claim 1 in which the mercaptoalcohol is 1-mercapto-2-butanol and the thiirane is 1,2-epithiobutane.

14. The method of claim 1 in which the mercaptoalcohol is 2,3-dimercapto-1-propanol and the thiirane is mercaptopropyl thiirane.

15. The method of claim 1 in which the mercaptoalcohol is 1-butoxy-3-mercapto-2-propanol and the thiirane is 1-butoxy-2,3-epithiopropane.

16. The method of claim 1 in which a mixture of mercaptoalcohols having two to four C atoms is dehydrated to form a mixture of corresponding thiiranes.

* * * * *